United States Patent [19]
Kyrtsos

[11] Patent Number: 5,606,506
[45] Date of Patent: Feb. 25, 1997

[54] METHOD AND APPARATUS FOR IMPROVING THE ACCURACY OF POSITION ESTIMATES IN A SATELLITE BASED NAVIGATION SYSTEM USING VELOCITY DATA FROM AN INERTIAL REFERENCE UNIT

[75] Inventor: Christos T. Kyrtsos, Peoria, Ill.

[73] Assignee: Caterpillar Inc., Peoria, Ill.

[21] Appl. No.: 42,738

[22] Filed: Apr. 5, 1993

[51] Int. Cl.$^6$ .............................. G06F 165/00
[52] U.S. Cl. .................. 364/449.1; 364/453; 342/357; 342/358; 342/457
[58] Field of Search .................... 364/443, 444, 364/449, 453, 454, 459; 73/178 R; 340/988, 990; 342/451, 457, 357, 358

[56] References Cited

U.S. PATENT DOCUMENTS

| | | | |
|---|---|---|---|
| 4,731,613 | 3/1988 | Endo et al. | 342/357 |
| 4,758,959 | 7/1988 | Thoone et al. | 364/454 |
| 4,899,285 | 2/1990 | Nakayama et al. | 364/453 |
| 5,075,693 | 12/1991 | McMillan et al. | 364/454 |
| 5,193,064 | 3/1993 | Maki | 364/454 |
| 5,220,509 | 6/1993 | Takemura et al. | 342/357 |
| 5,272,483 | 12/1993 | Kato | 342/357 |
| 5,276,451 | 1/1994 | Odagawa | 342/357 |
| 5,293,318 | 3/1994 | Fukushima | 364/449 |
| 5,317,515 | 5/1994 | Matsuzaki | 342/457 |
| 5,334,986 | 8/1994 | Fernhout | 342/357 |
| 5,349,530 | 9/1994 | Odagawa | 364/454 |

FOREIGN PATENT DOCUMENTS

| | | |
|---|---|---|
| 0496538A2 | 7/1992 | European Pat. Off. |
| 0519630A2 | 12/1992 | European Pat. Off. |
| 0567268A1 | 10/1993 | European Pat. Off. |
| 0566390A1 | 10/1993 | European Pat. Off. |
| 3310111 | 9/1984 | Germany. |

OTHER PUBLICATIONS

Upadhyay, Triveni N. et al., "Benefits of Integrating GPS and Inertial Navigation Systems," Archive No. CSDL-P-1503, The Charles Stark Draper Laboratory, Inc., Cambride, MA (Jun. 1982).

Upadhyay et al., "Benefits Of Integration GPS and Inertial Navigation Systems," CSDL-P-1503, Jun. 1982, pp.1-13.

Brockstein, "GPS-Kalman-Augmented Inertial Navigation System Performance," *NAECON '76 Record*, pp. 864-871.

Schwartz, "Sensitivity Analysis of an Integrated NAVSTAR GPS/INS Navigation System to Component Failure," *Navigation:Journal of the Institute of Navigation*, vol. 30, No. 4, 1983-1984, pp. 325-337.

Martin, "Aiding GPS Navigation Functions," *NAECON '76 Record*, pp. 849-856.

*Primary Examiner*—Gary Chin
*Attorney, Agent, or Firm*—Sterne, Kessler, Goldstein & Fox

[57] ABSTRACT

A method and apparatus for computing a precise position estimate for a receiver at or near the surface of the Earth uses a inertial reference unit associated with the receiver and a satellite-based navigation system. The satellite-based navigation system is used to determine a position estimate for the receiver at consecutive positions along its path of motion. The inertial reference unit is used to determine velocity vectors for the receiver. Each velocity vector corresponds to travel of the receiver between the consecutive positions. The velocity vectors from the inertial reference unit are used to refine the position estimates of the satellite-based navigation system to obtain precise position estimates.

3 Claims, 7 Drawing Sheets

METHOD AND APPARATUS FOR IMPROVING THE ACCURACY OF POSITION ESTIMATES IN A SATELLITE BASED NAVIGATION SYSTEM USING VELOCITY DATA FROM AN INERTIAL REFERENCE UNIT

FIELD OF THE INVENTION

This invention relates generally to the field of navigation systems which use a constellation of Earth-orbiting satellites to determine the position of a receiver at or near the Earth's surface. More specifically, the invention relates to a method and apparatus for improving the accuracy of position estimates in such a satellite based navigation system using data from an inertial reference unit.

BACKGROUND OF THE INVENTION

Several national governments, including the United States (U.S.) of America, are presently developing a terrestrial position determination system, referred to generically as a global positioning system (GPS). A GPS is a satellite-based radio-navigation system which is intended to provide highly accurate three-dimensional position information to receivers at or near the surface of the Earth.

The U.S. government has designated its GPS the "NAVSTAR." The NAVSTAR GPS is expected to be declared fully operational by the U.S. government in 1993. The government of the former Union of Soviet Socialist Republics (U.S.S.R.) is engaged in the development of a GPS known as "GLONASS". Further, two European systems known as "NAVSAT" and "GRANAS" are also under development. For ease of discussion, the following disclosure focuses specifically on the NAVSTAR GPS. The invention, however, has equal applicability to other global positioning systems.

In the NAVSTAR GPS, it is envisioned that four orbiting GPS satellites will exist in each of six separate circular orbits to yield a total of twenty-four GPS satellites. Of these, twenty-one will be operational and three will serve as spares. The satellite orbits will be neither polar nor equatorial but will lie in mutually orthogonal inclined planes.

Each GPS satellite will orbit the Earth approximately once every 12 hours. This coupled with the fact that the Earth rotates on its axis once every twenty-four hours causes each satellite to complete exactly two orbits while the Earth turns one revolution.

The position of each satellite at any given time will be precisely known and will be continuously transmitted to the Earth. This position information, which indicates the position of the satellite in space with respect to time (GPS time), is known as ephemeris data.

In addition to the ephemeris data, the navigation signal transmitted by each satellite includes a precise time at which the signal was transmitted. The distance or range from a receiver to each satellite may be determined using this time of transmission which is included in each navigation signal. By noting the time at which the signal was received at the receiver, a propagation time delay can be calculated. This time delay when multiplied by the speed of propagation of the signal will yield a "pseudorange" from the transmitting satellite to the receiver.

The range is called a "pseudorange" because the receiver clock may not be precisely synchronized to GPS time and because propagation through the atmosphere introduces delays into the navigation signal propagation times. These result, respectively, in a clock bias (error) and an atmospheric bias (error). Clock biases may be as large as several milliseconds.

Using these two pieces of information (the ephemeris data and the pseudorange) from at least three satellites, the position of a receiver with respect to the center of the Earth can be determined using passive triangulation techniques.

Triangulation involves three steps. First, the position of at least three satellites in "view" of the receiver must be determined. Second, the distance from the receiver to each satellite must be determined. Finally, the information from the first two steps is used to geometrically determine the position of the receiver with respect to the center of the Earth.

Triangulation, using at least three of the orbiting GPS satellites, allows the absolute terrestrial position (longitude, latitude, and altitude with respect to the Earth's center) of any Earth receiver to be computed via simple geometric theory. The accuracy of the position estimate depends in part on the number of orbiting GPS satellites that are sampled. Using more GPS satellites in the computation can increase the accuracy of the terrestrial position estimate.

Conventionally, four GPS satellites are sampled to determine each terrestrial position estimate. Three of the satellites are used for triangulation, and a fourth is added to correct for the clock bias described above. If the receiver's clock were precisely synchronized with that of the GPS satellites, then this fourth satellite would not be necessary. However, precise (e.g., atomic) clocks are expensive and are, therefore, not suitable for all applications.

For a more detailed discussion on the NAVSTAR GPS, see Parkinson, Bradford W. and Gilbert, Stephen W., "NAVSTAR: Global Positioning System—Ten Years Later," *Proceedings of the IEEE*, Vol. 71, No. 10, October 1983; and GPS: *A Guide to the Next Utility*, published by Trimble Navigation Ltd., Sunnyvale, Calif., 1989, pp. 1–47, both of which are incorporated herein by reference. For a detailed discussion of a vehicle positioning/navigation system which uses the NAVSTAR GPS, see commonly owned U.S. patent application Ser. No. 07/628,560, entitled "Vehicle Position Determination System and Method," filed Dec. 3, 1990, which is incorporated herein by reference.

The NAVSTAR GPS envisions two modes of modulation for the carrier wave using pseudorandom signals. In the first mode, the carrier is modulated by a "C/A signal" and is referred to as the "Coarse/Acquisition mode". The Coarse/Acquisition or C/A mode is also known as the "Standard Positioning Service". The second mode of modulation in the NAVSTAR GPS is commonly referred to as the "precise" or "protected" (P) mode. The P-mode is also known as the "Precise Positioning Service".

The P-mode is intended for use only by Earth receivers specifically authorized by the United States government. Therefore, the P-mode sequences are held in secrecy and are not made publicly available. This forces most GPS users to rely solely on the data provided via the C/A mode of modulation (which results in a less accurate positioning system).

Moreover, the U.S. government (the operator of the NAVSTAR GPS) may at certain times introduce errors into the C/A mode GPS data being transmitted from the GPS satellites by changing clock and/or ephemeris parameters. That is, the U.S. government can selectively corrupt the GPS data. The ephemeris and/or the clock parameters for one or more satellites may be slightly or substantially modified.

This is known as "selective availability" or simply SA. SA may be activated for a variety of reasons, such as national security.

When SA is activated, the U.S. government is still able to use the NAVSTAR GPS because the U.S. government has access to the P-mode modulation codes. The C/A mode data, however, may be rendered substantially less accurate.

In addition to the clock error, the atmospheric error and errors from selective availability, other errors which affect GPS position computations include receiver noise, signal reflections, shading, and satellite path shifting (e.g., satellite wobble). These errors result in computation of incorrect pseudoranges and incorrect satellite positions. Incorrect pseudoranges and incorrect satellite positions, in turn, lead to a reduction in the precision of the position estimates computed by a vehicle positioning system.

SUMMARY OF THE INVENTION

The invention is a method and apparatus for precisely computing position estimates for a vehicle using a satellite-based navigation system and an inertial reference unit (IRU). Essentially, the differences in position between GPS computed position estimates are compared to the displacement (velocity times time) vectors computed by IRU 304. The IRU computed vectors are used to minimize the difference between the GPS computed positions and the actual vehicle positions. In the preferred embodiment, at least three GPS computed position and two IRU computed displacement vectors are used.

In the preferred embodiment, the method of the invention includes the following steps: (a) receiving, from the constellation of navigation satellites, navigation signals at the receiver located at a first position at a first time; (b) computing, from the plurality of navigation signals, a first position estimate for the receiver at the first time; (c) moving the receiver to a second position at a second time; (d) receiving, from the constellation of navigation satellites, navigation signals at the receiver located at the second position at second time; (e) computing, from the navigation signals, a second position estimate for the receiver at the second time; (f) receiving a first velocity vector from the inertial reference unit for the elapsed time between the first time and the second time; (g) moving the receiver to a third position at a third time; (h) receiving, from the constellation of navigation satellites, navigation signals at the receiver located at a third position at a third time; (i) computing, from the plurality of navigation signals, a third position estimate for the receiver at the third time; (j) receiving a second velocity vector from the inertial reference unit for the elapsed time between the second time and the third time; and (k) computing a refined value for the third position estimate based on the first, second and third position estimates, the first and second velocity vectors and the elapsed times.

The apparatus of the invention includes: (a) receiver means, coupled to the vehicle, for receiving navigation signals from the constellation of navigation satellites and for computing a first position estimate for a first vehicle position at a first time, a second position estimate for a second vehicle position at a second time, and a third position estimate for a third vehicle position at a third time; (b) inertial means, coupled to the vehicle, for computing a first velocity vector of the vehicle for the period between the first and second times and for computing a second velocity vector of the vehicle for the period between the second and third times; and (c) processing means for refining the third position estimate based on the first, second and third position estimates, the first and second velocity vectors and the first, second and third times.

DESCRIPTION OF THE PREFERRED EMBODIMENT

The present invention is now described with reference to the figures where like reference numbers denote like elements/steps.

Figure 1:
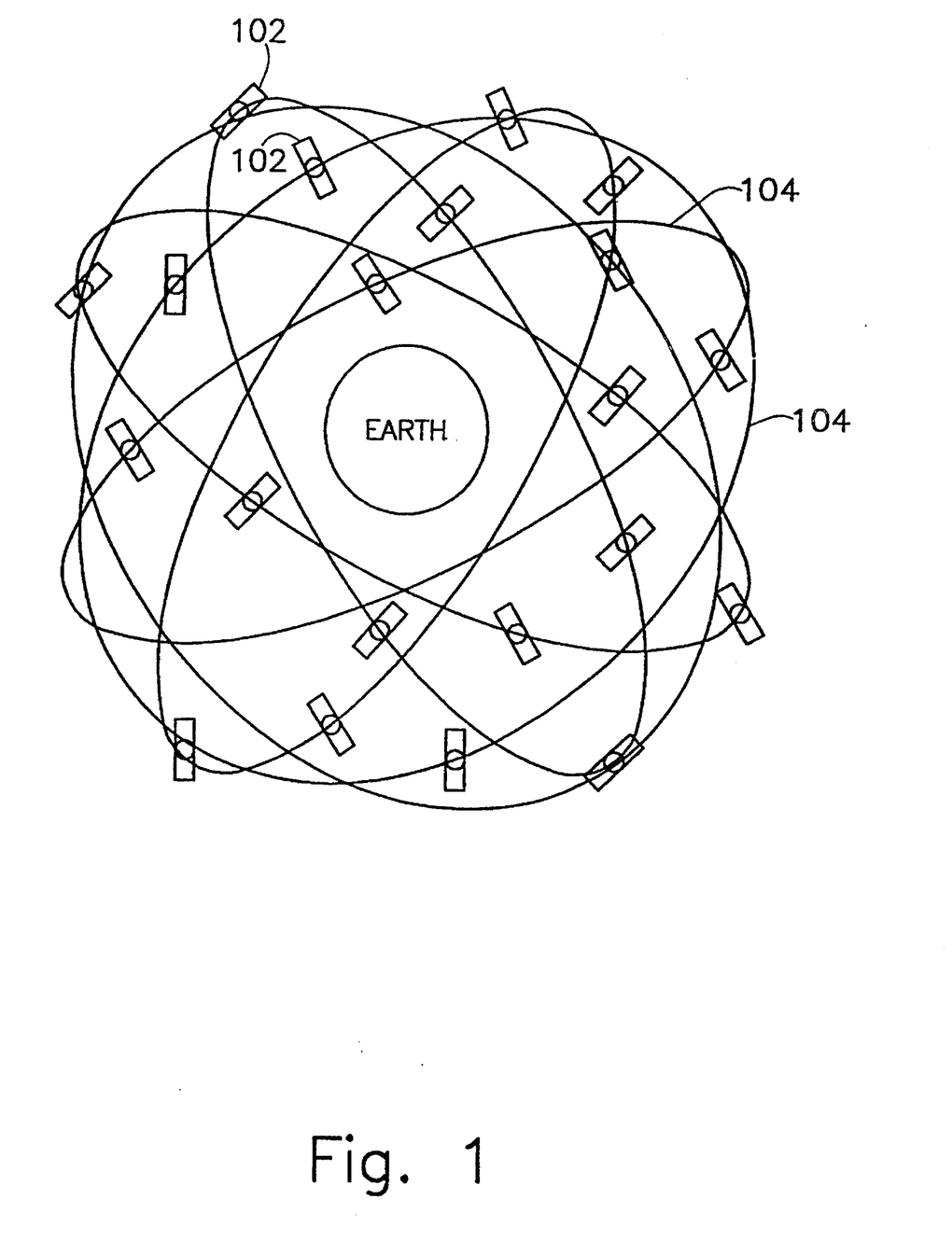
FIG. 1 is a diagram depicting the NAVSTAR GPS satellites in their respective orbits around the Earth.

The invention is a system and method for improving the accuracy of vehicle position estimates obtained from a satellite-based navigation system using data from an inertial reference unit. In the preferred embodiment, the NAVSTAR Global Positioning System (GPS) is used. As discussed above and illustrated in FIG. 1, the NAVSTAR GPS includes twenty-one operational satellites 102 which orbit the Earth in six orbits 104.

Figure 2:
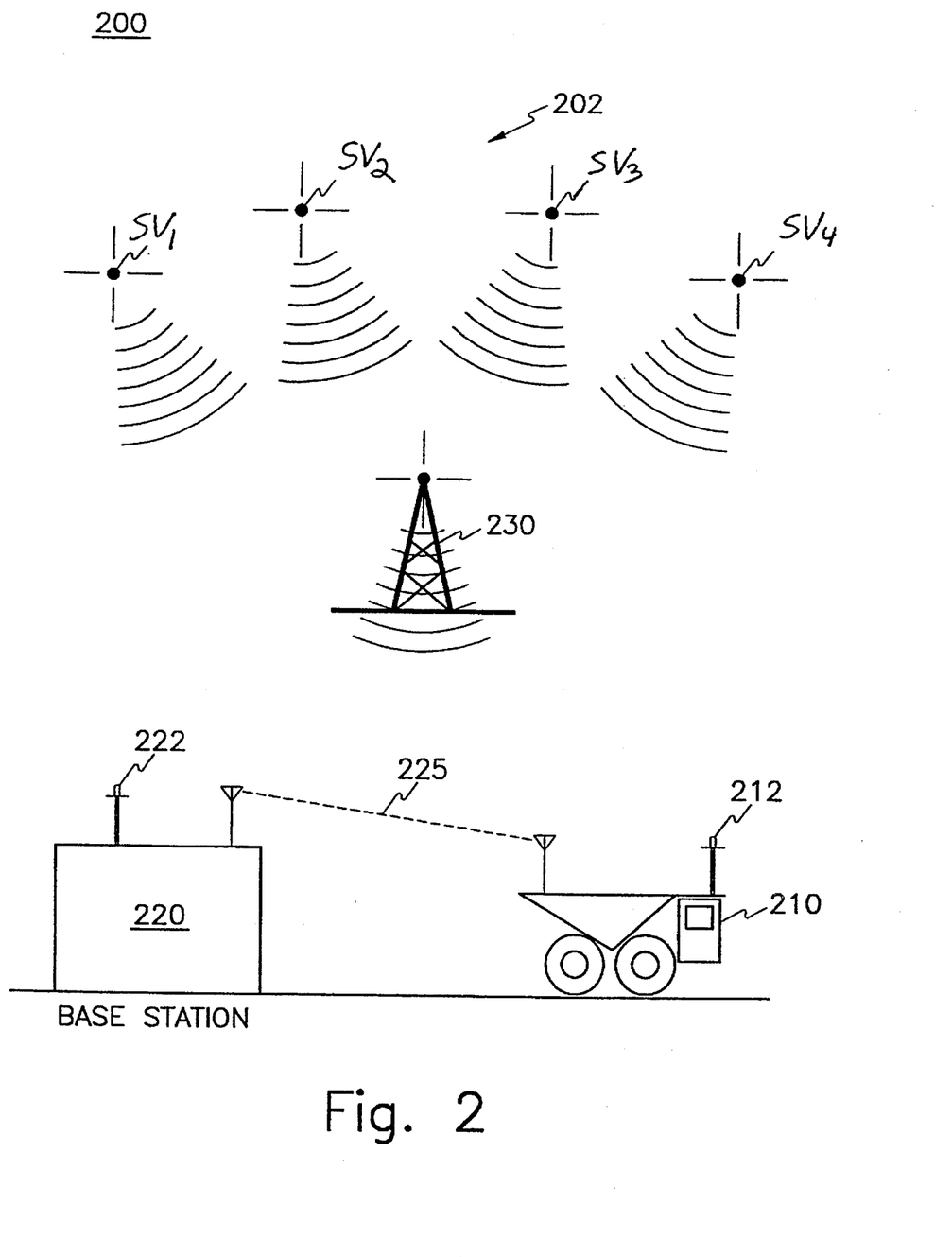
FIG. 2 is a diagram illustrating an autonomous vehicle system which includes a constellation of four GPS satellites, a pseudolite, a base station, and an autonomous vehicle.

The invention is described in the environment of an autonomous vehicle system 200 as shown in FIG. 2. A representative GPS constellation 202 includes four GPS satellites $SV_1$–$SV_4$ for transmitting GPS data. A vehicle (e.g., an autonomous mining truck) 210 and a base station 220 are adapted to receive the GPS data/navigation signals from each GPS satellite in the constellation using respective GPS antennas 212 and 222.

A GPS receiver can receive GPS navigation signals from a satellite which is "in view" of the receiver (i.e., line of sight communications). For example, "in view" may be defined as any satellite that is at least ten degrees up from the horizon. The ten degree angle provides a buffer zone between a useful, in view satellite and a satellite which is just passing out of view below the horizon.

A "constellation" is a group of satellites selected from the satellites "in view" of a GPS receiver. For example, four satellites may be selected from a group of six which are in view of a GPS receiver. The four satellites are normally selected because of a favorable geometry for triangulation (discussed below).

Base station 220 includes a GPS receiver (i.e., a reference receiver) which is located at a known, fixed position. Base station 220 communicates with vehicle 210 over communications channel 225.

Communication channel 225 represents the communications link between base station 220 and vehicle 210. In the preferred embodiment, communication channel 225 comprises radio transceivers. Communication channel 225 is used to transfer data between base station 220 and vehicle 210. This might be done, for example, if a differential GPS system was implemented.

System 200 may optionally include one or more pseudolites 230. A "pseudolite" is a transmitting system located on or near the Earth's surface which emulates a GPS satellite. Because a pseudolite has a fixed, known position, it can greatly enhance the position estimates derived from GPS. For ease of discussion herein, only GPS satellites 102 (also referred to as $SV_i$ or space vehicle) will be referenced. It should be understood, however, that where position data from a satellite is required, pseudolite data may be substituted.

Figure 3:
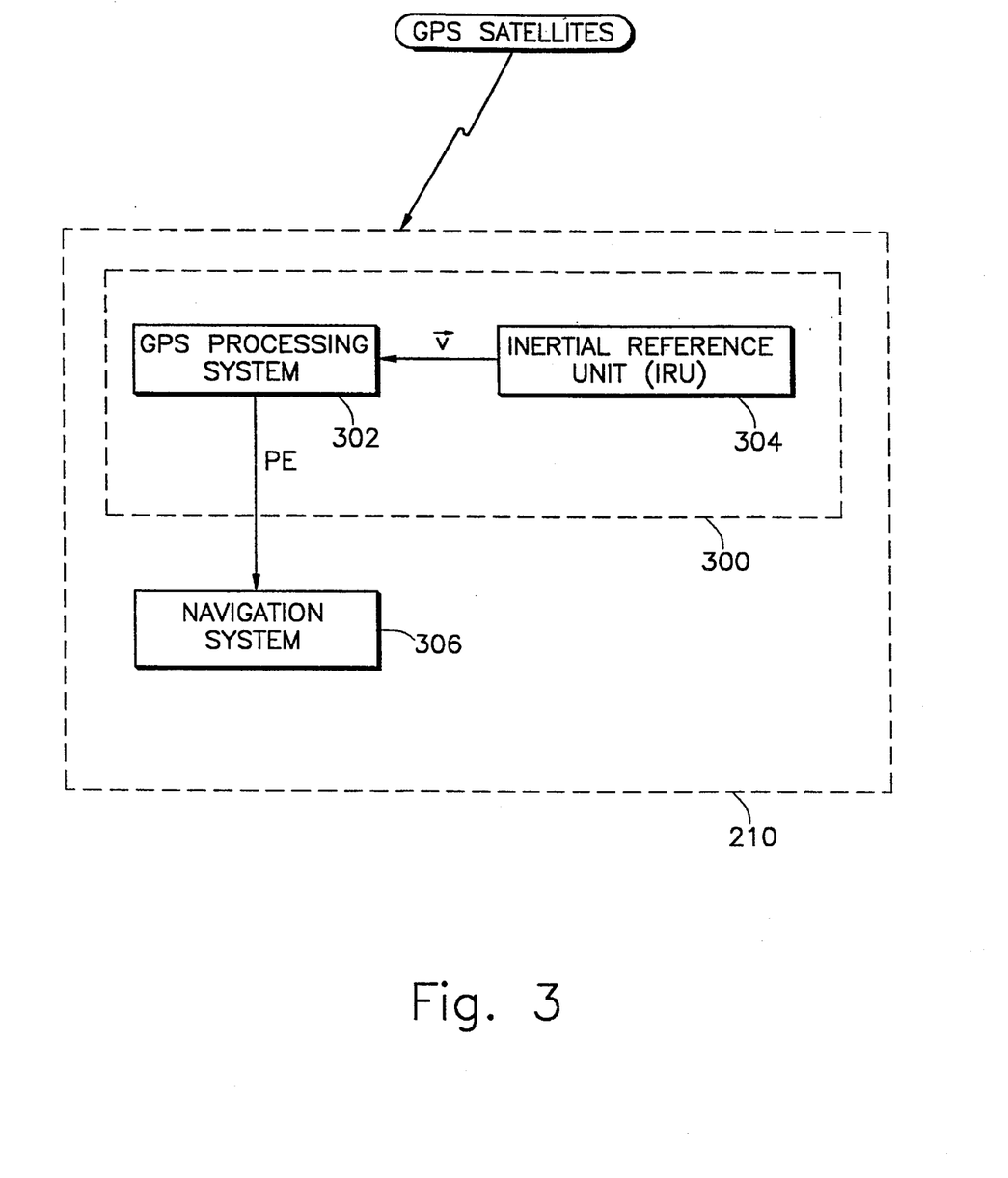
FIG. 3 is a block diagram of the autonomous vehicle system of the invention.

The task of guiding vehicle 210 along a prescribed path requires, among other things, an accurate estimate of the vehicle's current position relative to some reference point. Once the current position is known, vehicle 210 can be commanded to proceed to its next destination. To accomplish this automated vehicle operation, vehicle 210 includes a vehicle positioning system (VPS) 300 and a navigation system 306. This is illustrated in FIG. 3.

VPS 300 allows position estimates (PE) of vehicle 210 to be determined with extreme precision. Navigation system 306 receives the position estimates from VPS 300. Navigation system 320 then uses these precise position estimates to accurately navigate vehicle 210.

VPS 300 includes a GPS processing system 302 and an inertial reference unit (IRU) 304. GPS processing system 302 receives GPS data, i.e., navigation signals, from GPS satellites 102 and velocity data from IRU 304 and computes a position estimate for vehicle 210 therefrom. IRU 304 tracks changes in vehicle position using accelerometers and/or laser gyroscopes.

Figure 4:
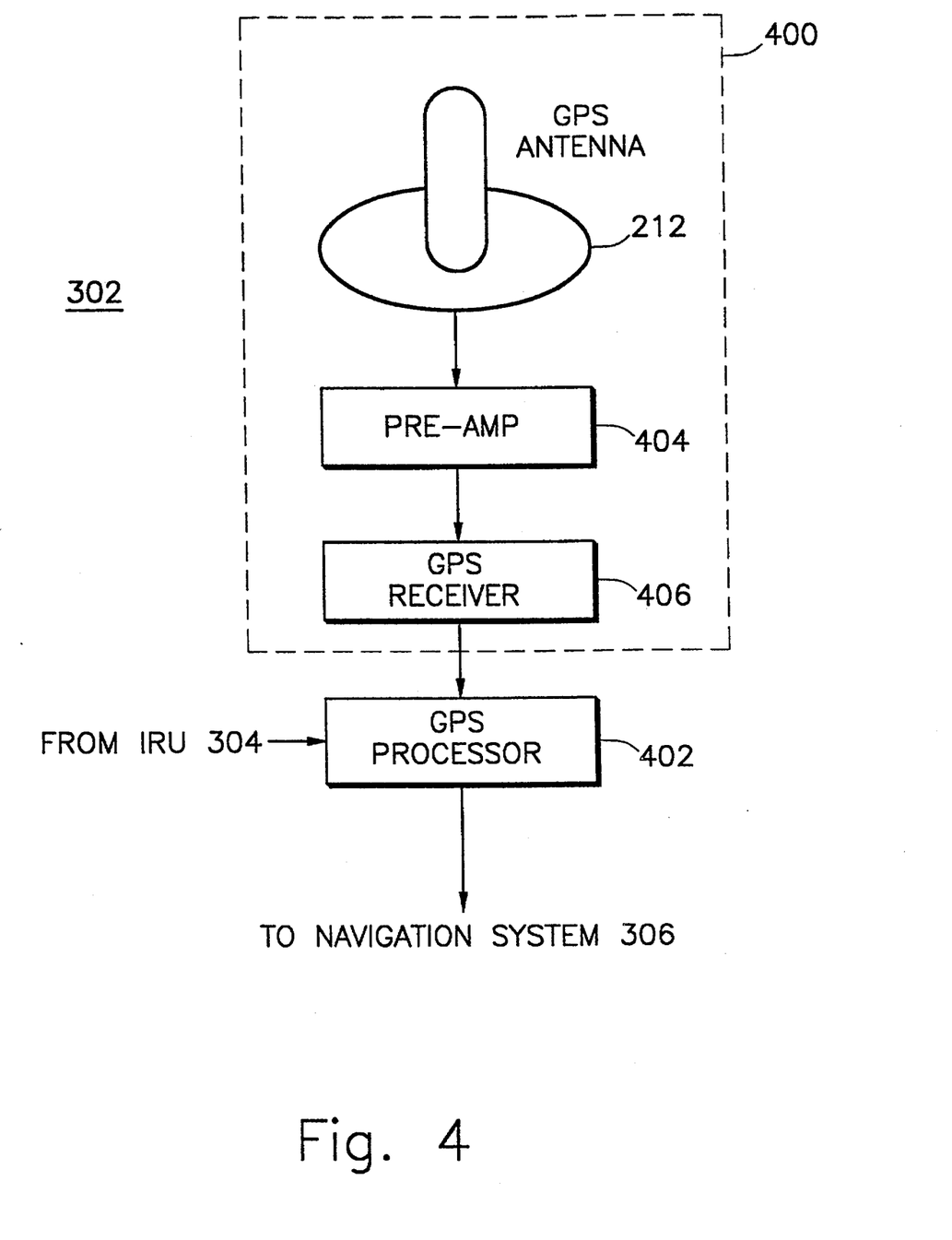
FIG. 4 is a block diagram of a GPS processing system.

GPS processing system 302 is the heart of system 200. With reference to FIG. 4, GPS processing system 302 includes a receiver system 400 and a GPS processor 402. Receiver system 400 receives and decodes the navigation signals from the satellites. GPS processor 402 then uses the information from receiver system 400 to compute the vehicle position estimate.

Receiver system 400 includes a GPS antenna 212, a preamplifier 404, and a GPS receiver 406. Antenna 212 is adapted to receive electromagnetic radiation in the radio portion of the spectrum. Preamplifier 404 amplifies a GPS navigation signal received by GPS antenna 212 from a selected GPS satellite. GPS receiver 406 is a multi-channel receiver which decodes the GPS navigation signals and produces a pseudorange and a satellite position for each selected satellite. GPS processor 402 uses the pseudoranges and satellite positions for a plurality of satellites to calculate the position estimate for vehicle 210.

In the preferred embodiment, antenna 212 and preamplifier 404 are integrated into a single unit. The combined antenna/preamplifier 212/404 and receiver 406 are available together under part number MX4200 from Magnavox Advanced Products and Systems Co., Torrence, Calif. GPS processor 402 includes an MC68020 microprocessor, available from Motorola, Inc., of Schaumburg, Ill.

Receiver 406 computes a pseudorange for each satellite as follows. As described above, each signal transmitted by a GPS satellite is continuously encoded with the exact time at which the signal was transmitted. By noting the time at which the signal was received at receiver 406, a propagation time delay can be computed. This time delay when multiplied by the speed of propagation of the signal ($2.9979245998 \times 10^8$ m/s) will yield the pseudorange from the transmitting satellite to the receiver. As discussed above, the range is called a "pseudorange" because the receiver clock is not precisely synchronized to GPS time (causing a clock error) and because propagation through the different layers of the atmosphere changes the speed of the propagating signals (causing an atmospheric error).

GPS receiver 406 may use an almanac to roughly determine the position of a satellite (e.g., for acquisition purposes). For a more precise determination of satellite position, the receiver decodes the GPS navigation signal and extracts ephemeris data therefrom. The ephemeris data indicates the precise position of the transmitting satellite.

In addition to computing transmission time delays, GPS receiver 406 can compute pseudoranges using accumulated delta range (ADR) or carrier techniques. An ADR is computed by tracking the phase of the carrier wave of the GPS navigation signal. As a satellite and a GPS receiver move away from each other, the increase in distance can be noted as a phase change in the GPS carrier wave. Because the GPS carrier wave is a continuous sinusoid, an ADR is not an absolute range. Rather, an ADR is a relative change in the range between the satellite and the receiver. Hence, this technique yields a "delta" range.

ADR techniques can be used to compute very accurate pseudoranges. When the term "pseudorange" is used herein, it refers to a pseudorange computed using either ADR techniques or transmission time delay techniques.

From a user's perspective, GPS processing system 302 is the most important part of the autonomous vehicle system 200. GPS processing system 302 is responsible for receiving the signals from each GPS satellite, for selecting the optimal satellites for processing, for determining the precise position of each selected satellite, for determining the pseudorange to each satellite, and ultimately for estimating the position of the receiver based on the satellite positions and the pseudoranges. All of this must be done using received data (of greatly attenuated amplitudes) which is most often heavily corrupted with noise (including noise produced by the atmosphere, the preamplifier and the receiver). GPS processing system 302 relies extensively on Kalman Filtering to eliminate the noise from the GPS navigation signals.

The Kalman filter is a recursive least-squares algorithm which is normally implemented via software or firmware on a digital computer (processor 402). In the preferred embodiment, the Kalman filter assumes that the noisy signals are discrete rather than continuous in nature. Both the data and noise are modeled in vector form, and the data is processed recursively.

A Kalman filter performs two functions. First, it extrapolates a data estimate from previous data. Second, it updates and refines the extrapolated data estimate based on current data. For example, if a vehicle position $p_1$ and velocity $v_1$ are known at time $t_1$, then the filter (performing the extrapolation step) will use $p_1$ and $v_1$ to estimate a position $p_2$ at a time $t_2$. Thereafter (performing the update step), newly acquired data at time $t_2$ is used to refine the position estimate $p_2$. Dam which is fed to the Kalman filter to aid in either the extrapolation or the update/refinement steps is said to "constrain" the filter.

Kalman filtering is well known in the art. For a more detailed discussion on Kalman filtering, see Brown, R. G., "Kalman Filtering: A Guided Tour," Iowa State University;

and Kao, Min H. and Eller, Donald H., "Multiconfiguration Kalman Filter Design for High-Performance GPS Navigation," *IEEE Transactions on Automatic Control*, Vol. AC-28, No. 3, March 1983, the relevant teachings of which are incorporated by reference.

Conventionally, because the Kalman filter is a linear filter, the distance equations set forth above are not solved directly, but are first linearized. That is, the equations are differentiated and the derivative of each equation is solved in order to compute a change from a last known position. For example, a first position estimate at time $t_i$ can be rapidly computed by GPS processor 402 by differentiating the navigation equations and solving for a change in position $(\Delta x_v, \Delta y_v, \Delta z_v)$ from a last known vehicle position $(x_v, y_v, z_v)_{i-1}$ at $t_{i-1}$. This greatly simplifies the solution of the distance equations.

As an alternative to Kalman filtering, least squares estimation or best fit polynomial matching may be used.

Figure 5:
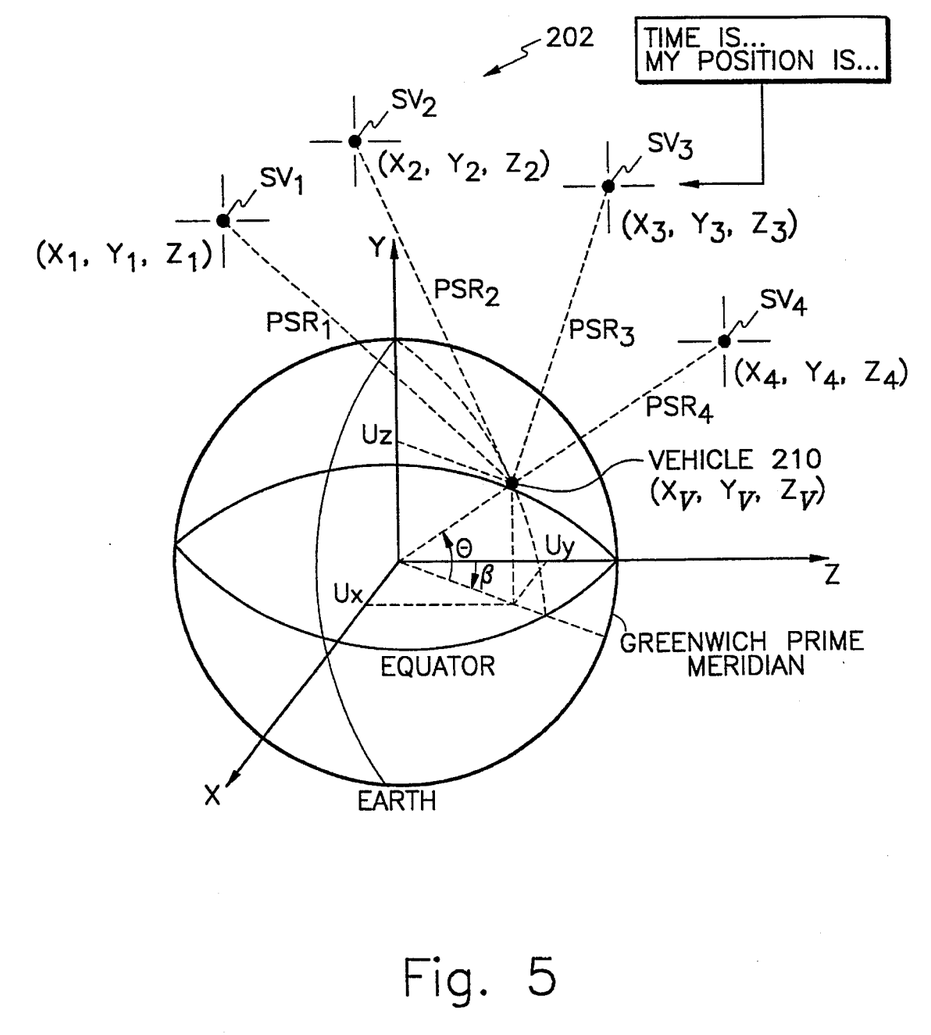
FIG. 5 is a diagram showing the geometric relationship between the center of the Earth, a vehicle near the surface of the Earth and a constellation of GPS satellites.

The basic method used by GPS processor 402 in calculating the vehicle position estimate from the pseudoranges and satellite positions is described with reference to FIG. 5. FIG. 5 shows a sample satellite constellation 202, having GPS satellites $SV_1$–$SV_4$, in view of vehicle 210. In Cartesian coordinates, with respect to the center of the Earth, satellite $SV_1$ is located at $(x_1, y_1, z_1)$; satellite $SV_2$ is located at $(x_2, y_2, z_2)$; satellite $SV_3$ is located at $(x_3, y_3, z_3)$; satellite $SV_4$ is located at $(x_4, y_4, z_4)$; and vehicle 210 is located at a position $(x_v, y_v, z_v)$.

The Cartesian (x,y,z) coordinates of each satellite are determined by GPS receiver 406 using a satellite's ephemeris data. The pseudoranges ($PSR_1$, $PSR_2$, $PSR_3$ and $PSR_4$) between vehicle 210 and each satellite are determined by GPS receiver 406 using transmission time delays. Given this information for at least four satellites, the location of vehicle 210 (i.e., receiver 406) may be determined using the following four distance equations:

$$(x_1-x_v)^2+(y_1-y_v)^2+(z_1-z_v)^2=(PSR_1-B_{clock})^2$$

$$(x_2-x_v)^2+(y_2-y_v)^2+(z_2-z_v)^2=(PSR_2-B_{clock})^2$$

$$(x_3-x_v)^2+(y_3-y_v)^2+(z_3-z_v)^2=(PSR_3-B_{clock})^2$$

$$(x_4-x_v)^2+(y_4-y_v)^2+(z_4-z_v)^2=(PSR_4-B_{clock})^2$$

where: $B_{clock}$=clock bias

The "clock bias" is a zero order correction factor which roughly compensates for the clock error discussed above.

Note that there are four unknowns in these equations: $x_v$, $y_v$, $z_v$, and $B_{clock}$. Note also that each satellite produces an equation. Thus, we have four satellites and four unknowns, allowing the equations to be solved for the clock bias ($B_{clock}$) and the position $(x_v, y_v, z_v)$ of vehicle 210.

If the clock bias ($B_{clock}$) is eliminated, then only three variables remain in the equation such that only three satellites are necessary to solve for the position of vehicle 210. The clock bias can be eliminated if a high precision clock (e.g., an atomic clock) is used in receiver system 400.

Note that the accuracy of the GPS position estimate is highly dependent on the pseudoranges computed by receiver 406. As discussed above, these pseudoranges can be heavily corrupted by atmospheric effects, selective availability, multi-path errors (reflections), and clock errors. The invention uses data from IRU 304 to substantially improve the accuracy of the initial GPS position estimates to produce refined vehicle position estimates. The invention is based on the premise that the IRU is capable of accurately tracking changes in vehicle position (velocities) over a short time period.

The method of the invention involves computing a difference in position between two GPS computed position estimates, comparing the difference to a vector computed by IRU 304, and then refining the estimated vehicle positions using the IRU data.

Figure 6:
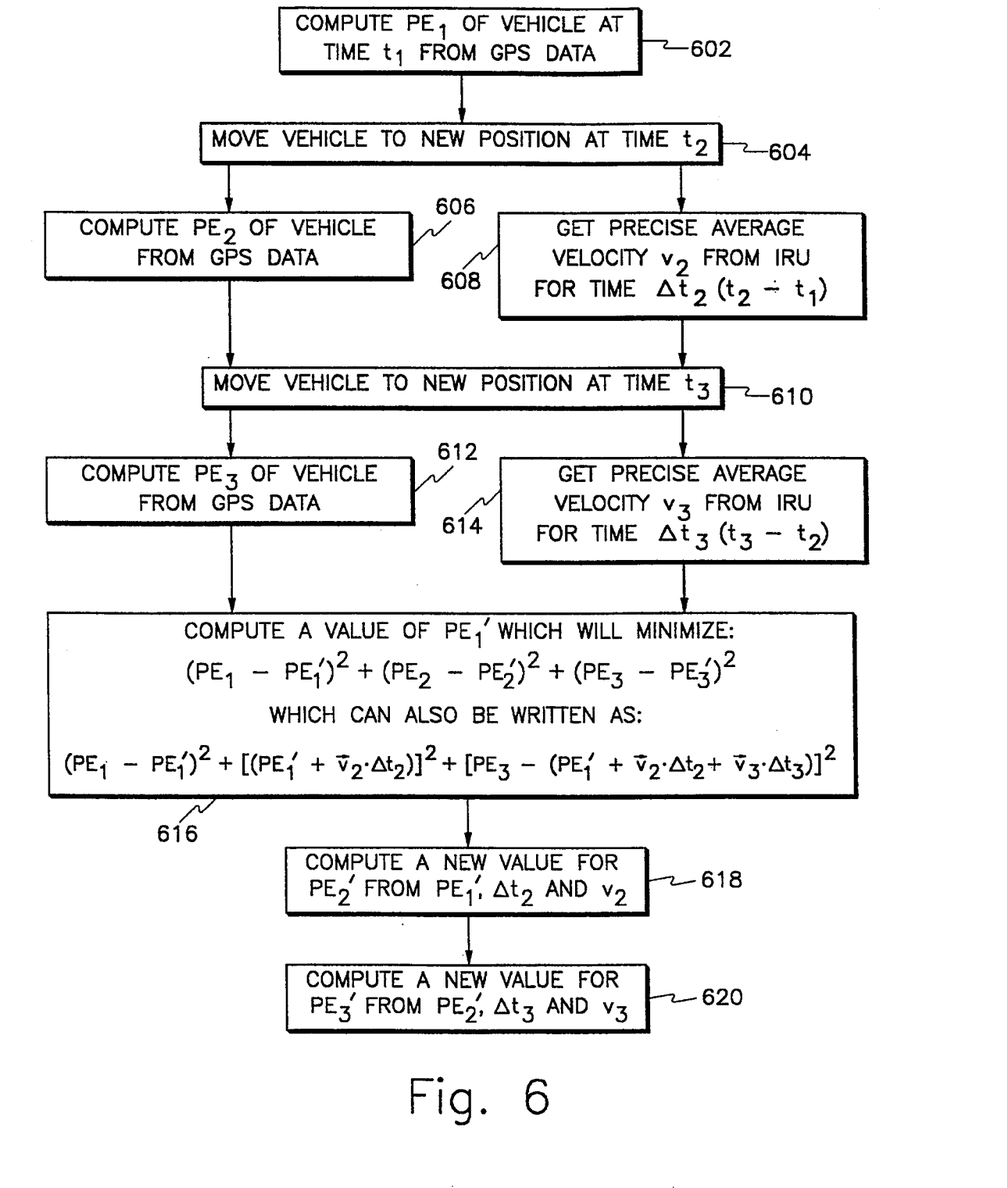
FIG. 6 is a flow chart illustrating the preferred embodiment of the method of the invention of improving GPS position estimates using data from an inertial reference unit (IRU)

FIG. 6 provides a specific example of operation of the method of the invention. Note that while three data points (GPS position estimates) are used in the following example, any number greater than two may be used. In a step 602, a first position estimate ($PE_1$) of the vehicle is computed from GPS data received at time $t_1$. Note that this position estimate contains errors. The actual position is represented by $PE_1'$.

At a step 604, the vehicle is moved to a second position ($PE_2'$) at a time $t_2$. At a step 606, a second position estimate ($PE_2$) of the vehicle is computed from GPS data received at time $t_2$. Also at time $t_2$, in a step 608, an average velocity $v_2$ is received from (computed by) IRU 304 for the elapsed time $\Delta t_2$ between times $t_2$ and $t_1$.

In a step 610, the vehicle is moved to a third position ($PE_3'$) at a time $t_3$. In a step 612, a third position estimate $PE_3$ of the vehicle is computed from GPS data received at time $t_3$. Also at time $t_3$, in a step 614, an average velocity $v_3$ is received from (computed by) IRU 304 for the elapsed time $\Delta t_3$ between times $t_3$ and $t_2$. Note that since the IRU is able to produce precise velocity vectors for short time periods that $PE_2'=PE_1'+\vec{v}_2\cdot\Delta t_2$ and $PE_3'=PE_1'+\vec{v}_2\cdot\Delta t_2+\vec{v}_3\cdot\Delta t_3$.

At step 616, a value $PE_1'$ is computed which will minimize the follow equation:

$$(PE_1-PE_1')^2+(PE_2-PE_2')^2+(PE_3-PE_3')^2$$

which can also be written as:

$$(PE_1-PE_1')^2+[PE_2-(PE_1'+\vec{v}_2\cdot\Delta t_2)]^2$$

$$+[PE_3-(PE_1'+\vec{v}_2\cdot\Delta t_2+\vec{v}_3\cdot\Delta t_3)]^2$$

The value of $PE_1'$ which will minimize the value of this equation may be computed by a number of known techniques. For example, the first derivative of the equation may be set equal to zero and solved for $PE_1'$.

Note that each position estimate $PE_i$ actually represents the cartesian coordinates $(x_i, y_i, z_i)$ for the position. Thus, the actual equation to be minimized will contain the x,y,z coordinates rather than the vector PE. For example, the equation $$(PE_1-PE_1')^2+(PE_2-PE_2')^2+(PE_3-PE_3')^2$$

will expand to $$(x_1-x_1')^2+(x_2-x_2')^2+(x_3-x_3')^2$$

$$+(y_1-y_1')^2+(y_2-y_2')^2+(y_3-y_3')^2$$

$$+(z_1-z_1')^2+(z_2-z_2')^2+(z_3-z_3')^2$$

where:

$$x_2'=x_1'+\vec{v}_{x2}\cdot\Delta t_2$$

$$y_2'=y_1'+\vec{v}_{y2}\cdot\Delta t_2$$

$$z_2'=z_1'+\vec{v}_{z2}\cdot\Delta t_2$$

and $$x_3'=x_1'+\vec{v}_{x2}\cdot\Delta t_2+\vec{v}_{x3}\cdot\Delta t_3$$

$$y_3' = y_1' + \vec{v}_{y2} \cdot \Delta t_2 + \vec{v}_{y3} \cdot \Delta t_3$$

$$z_3' = z_1' + \vec{v}_{z2} \cdot \Delta t_2 + \vec{v}_{z3} \cdot \Delta t_3$$

Note that $PE_1'$ ($x_1', y_1', z_1'$) from step 616 is the precise position of the vehicle at time $t_1$. Thus, once $PE_1'$ is computed, precise positions $PE_2'$ and $PE_3'$ can be computed using the vector relationships from the IRU set forth above (steps 618–620).

As described above, IRU data used in the computations includes a time and a velocity. The time ($\Delta t$) is the elapsed time since the last position estimate was taken. The average velocity (i.e., $v_x$, $v_y$, $v_z$) of the vehicle during $\Delta t$ is provided by the IRU.

Figure 7:
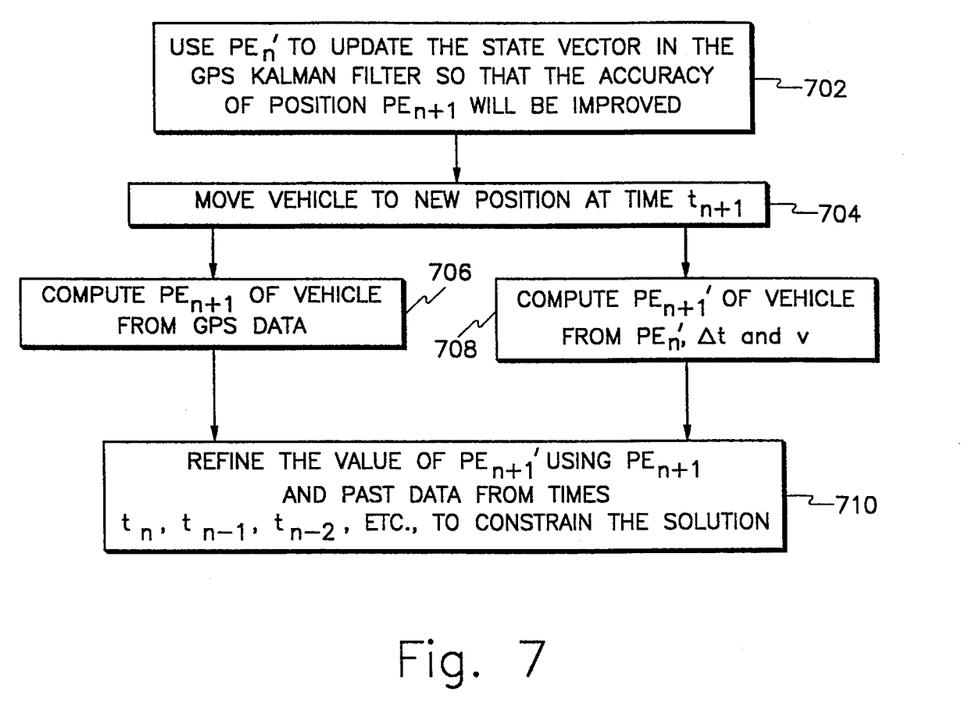
FIG. 7 is a flow chart illustrating the continuous updating of GPS position estimates based on IRU data.

Once a precise position estimate has been obtained using the invention, it may be continually updated. This is illustrated in FIG. 7. At a step 702, a precise position estimate $PE_n'$ (e.g., $PE_3'$ in the example set forth above) is used to update the state vector in the GPS Kalman filter so that the accuracy of position estimate $PE_{n+1}$ will be improved. At step 704, the vehicle is moved to position $PE_{n+1}$ at a time $t_{n+1}$.

At step 706, a position estimate $PE_{n+1}$ is computed from GPS data. In a step 708, a position estimate $PE_{n+1}'$ for the vehicle at time $t_{n+1}$ is computed as a change in position from position $PE_n$ using the elapsed time $\Delta t$ and the average velocity v during this period. Finally, at step 710, the value of $PE_{n+1}'$ is refined using GPS position estimate $PE_{n+1}$ and past data from times $t_n$, $t_{n-1}$, $t_{n-2}$, etc., to constrain the solution.

The invention relies on the fact that IRU data is an extremely accurate measure of relative position over short time intervals. The corrected vehicle path resulting from this method will be highly accurate. The number of subsequent IRU data points which are used to produce a mean vehicle path will effect the precision of this method. The more subsequent data points that are used, the better will be the refinement of the initial position estimate. The trade off, however, is that more data points requires greater computing power. This is especially important if the invention is to operate in positioning the vehicle in real time.

While the invention has been particularly shown and described with reference to several preferred embodiments thereof, it will be understood by those skilled in the art that various changes in form and details may be made therein without departing from the spirit and scope of the invention as defined in the appended claims.

I claim:

1. A method for computing a precise position estimate for a receiver at or near the surface of the Earth using an inertial reference unit associated with the receiver and a satellite-based navigation system including a constellation of navigation satellites, the method comprising the steps of:

(a) receiving, from the constellation of navigation satellites, navigation signals at the receiver located at a first position at a first time;

(b) computing, from said plurality of navigation signals, a first position estimate for the receiver at said first time, said first position estimate representing a single point at or near the surface of the Earth;

(c) moving the receiver to a second position at a second time;

(d) receiving, from the constellation of navigation satellites, navigation signals at the receiver located at said second position at second time;

(e) computing, from said navigation signals, a second position estimate for the receiver at said second time, said second position estimate representing a single point at or near the surface of the Earth;

(f) receiving a velocity vector from the inertial reference unit for the elapsed time between said first time and said second time; and (g) computing a refined value for said second position estimate based on said first position estimate, said second position estimate, said velocity vector and said elapsed time.

2. An apparatus for computing a precise position estimate for a vehicle moving on or near the surface of the Earth using a satellite-based navigation system including a constellation of navigation satellites, the apparatus comprising:

(a) receiver means, coupled to the vehicle, for receiving navigation signals from the constellation of navigation satellites and for computing a first position estimate for a first vehicle position at a first time, a second position estimate for a second vehicle position at a second time, and a third position estimate for a third vehicle position at a third time, each of said first, second and third position estimates representing a single point at or near the surface of the Earth;

(b) inertial means, coupled to the vehicle, for computing a first velocity vector of the vehicle for the period between said first and second times and for computing a second velocity vector of the vehicle for the period between said second and third times; and (c) processing means for refining said third position estimate based on said first, second and third position estimates, said first and second velocity vectors and said first, second and third times.

3. A method for determining a position of a receiver at or near the surface of the Earth using an inertial reference unit coupled to the receiver and a satellite-based navigation system including a constellation of navigation satellites, the method comprising the steps of:

(a) receiving, from the constellation of navigation satellites, navigation signals at the receiver located at a first position at a first time;

(b) computing, from said plurality of navigation signals, a first position estimate for the receiver at said first time, said first position estimate representing a single point at or near the surface of the Earth;

(c) moving the receiver to a second position at a second time;

(d) receiving, from the constellation of navigation satellites, navigation signals at the receiver located at said second position at second time;

(e) computing, from said navigation signals, a second position estimate for the receiver at said second time, said second position estimate representing a single point at or near the surface of the Earth;

(f) receiving a first velocity vector from the inertial reference unit for the elapsed time between said first time and said second time;

(g) moving the receiver to a third position at a third time;

(h) receiving, from the constellation of navigation satellites, navigation signals at the receiver located at a third position at a third time;

(i) computing, from said plurality of navigation signals, a third position estimate for the receiver at said third time, said third position estimate representing a single point at or near the surface of the Earth;

(j) receiving a second velocity vector from the inertial reference unit for the elapsed time between said second time and said third time; and (k) computing a refined value for said third position estimate based on said first, second and third position estimates, said first and second velocity vectors and said elapsed times.

* * * * *